United States Patent
Leone et al.

(10) Patent No.: US 7,051,943 B2
(45) Date of Patent: May 30, 2006

(54) PORTABLE HANDHELD ELECTRONIC ARTICLE SURVEILLANCE AND SCANNER DEVICE

(75) Inventors: Steven V. Leone, Lake Worth, FL (US); Larry Canipe, Boca Raton, FL (US); Timothy J. Relihan, Boca Raton, FL (US); Rich Labit, Wellington, FL (US); Ron Easter, Parkland, FL (US); Armando Varela, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 10/412,739

(22) Filed: Nov. 3, 2003

(65) Prior Publication Data

US 2004/0046027 A1 Mar. 11, 2004

Related U.S. Application Data

(60) Provisional application No. 60/372,016, filed on Apr. 11, 2002.

(51) Int. Cl.
*G06K 7/10* (2006.01)

(52) U.S. Cl. .......................... 235/462.45; 235/462.01; 235/462.13; 235/462.3; 235/383

(58) Field of Classification Search ........... 235/462.45, 235/462.01, 462.13, 383, 426.3, 375, 462.3; 340/572.1, 426.18; 710/7; 607/32, 5
See application file for complete search history.

(56) References Cited

U.S. PATENT DOCUMENTS

| | | | | |
|---|---|---|---|---|
| 3,668,675 A | * | 6/1972 | Joens et al. ............ | 340/426.18 |
| 5,126,545 A | * | 6/1992 | Barkan ................... | 235/462.25 |
| 5,151,684 A | * | 9/1992 | Johnsen ................... | 340/568.1 |
| 5,600,121 A | | 2/1997 | Kahn et al. ................ | 235/472 |
| 5,640,002 A | * | 6/1997 | Ruppert et al. ........ | 235/462.46 |
| 5,892,971 A | * | 4/1999 | Danielson et al. ............. | 710/7 |
| 6,009,350 A | * | 12/1999 | Renken ........................ | 607/32 |
| 6,189,789 B1 | | 2/2001 | Levine et al. ............... | 235/383 |
| 6,201,469 B1 | | 3/2001 | Balch et al. ................ | 340/10.1 |
| 6,328,212 B1 | * | 12/2001 | Metlitasky et al. .... | 235/462.16 |
| 6,517,000 B1 | * | 2/2003 | McAllister et al. .... | 235/462.01 |
| 2002/0050526 A1 | * | 5/2002 | Swartz et al. .......... | 235/472.02 |
| 2002/0119580 A1 | * | 8/2002 | Corless et al. ............. | 436/518 |
| 2002/0149483 A1 | * | 10/2002 | Shanks et al. ........... | 340/572.1 |
| 2003/0052161 A1 | * | 3/2003 | Rakers et al. ............... | 235/375 |
| 2003/0146280 A1 | * | 8/2003 | Acosta et al. ............... | 235/454 |
| 2003/0209600 A1 | * | 11/2003 | Collins et al. .............. | 235/383 |
| 2004/0056101 A1 | * | 3/2004 | Barkan et al. ......... | 235/472.03 |
| 2004/0113791 A1 | * | 6/2004 | Salim et al. ............. | 340/572.3 |
| 2005/0027318 A1 | * | 2/2005 | Ware et al. .................... | 607/5 |

FOREIGN PATENT DOCUMENTS

| WO | WO 02/43021 | 5/2002 |
|---|---|---|
| WO | WO 02/63771 | 8/2002 |

* cited by examiner

*Primary Examiner*—Karl D. Frech
*Assistant Examiner*—Allyson N Trail (57) ABSTRACT

A handheld combined electronic article surveillance (EAS) and barcode scanner device. The device may be configured for wireless communication with a point of sale network so that is entirely portable within a protected area. The device may include a capacitor disposed in handle at a proximal end of the device and an antenna may be disposed at a distal end of the device. A base station may be provided for receiving the device.

37 Claims, 9 Drawing Sheets

PORTABLE HANDHELD ELECTRONIC ARTICLE SURVEILLANCE AND SCANNER DEVICE

CROSS REFERENCE TO RELATED APPLICATIONS

The present application claims the benefit of the filing date of U.S. Provisional Application Ser. No. 60/372,016, filed Apr. 11, 2002, the teachings of which are incorporated herein by reference.

FIELD OF THE INVENTION

The present invention relates to handheld devices, and, in particular, to a combined portable handheld electronic article surveillance (EAS) and scanner device.

BACKGROUND

Electronic Article Surveillance (EAS) systems are typically utilized to protect and track assets. In an EAS system, an interrogation zone may be established at the perimeter, e.g. at an exit area, of a protected area such as a retail store. The interrogation zone is established by an antenna or antennas positioned adjacent to the interrogation zone. The antenna(s) establish an electromagnetic field of sufficient strength and uniformity within the interrogation zone. EAS markers are attached to each asset to be protected. When an article is properly purchased or otherwise authorized for removal from the protected area, the EAS marker is either removed or deactivated.

If the marker is not removed or deactivated, the electromagnetic field causes a response from the EAS marker in the interrogation zone. An antenna acting as a receiver detects the EAS marker's response indicating an active marker is in the interrogation zone. The associated controller provides an indication of this condition, e.g., an audio alarm, such that appropriate action can be taken to prevent unauthorized removal of the item.

EAS tag deactivation devices may be fixed at a specific location, such as adjacent a point-of-sale (POS) station in a retail environment. A barcode scanner may also be located at the POS station for scanning a barcode affixed to the article. Barcode systems and scanners are well known. Barcodes may be used for a variety of purposes, such as inventory control and for managing POS transactions. Upon purchase of an article, the barcode may be scanned at a POS station. The barcode represents a reference number that is communicated to a computer to look up an associated record containing descriptive data such as product name, vendor name, price, quantity-on-hand, etc. The computer performs a "price lookup" and displays the price on the cash register. The computer may also subtract the quantity purchased from the quantity-on-hand and perform other informational or management functions related to the purchased products.

When it is determined that the article is authorized for removal from the controlled location, e.g., after a proper purchase, any EAS tag affixed to the article is deactivated. If an EAS tag is inadvertently not deactivated at the deactivator adjacent the POS station, the EAS tag will set off an alarm at the store exit. To then deactivate the EAS tag, the article must be returned to the deactivator adjacent the POS station, which causes customer confusion and embarrassment.

Handheld devices including deactivators for RF type EAS tags and a barcode scanner have been developed. These devices have, however, been coupled to the POS station via power and data cables. Accordingly, they require the EAS tag be moved near the POS station, within range of the handheld scanner/deactivator cord, for scanning and deactivating. To date, no known system has allowed complete freedom of movement within a controlled area for barcode scanning and EAS tag deactivation.

In addition, known handheld EAS devices and combined EAS and barcode scanner devices are cumbersome and cause user fatigue. Also, some EAS handheld or combined EAS and barcode scanner devices are designed to couple to a docking station when not in use. The docking station may provide a convenient place for recharging of a battery and a point of communication with other systems. However, given the portable nature of the handheld device, unauthorized personnel may gain access to the device.

Accordingly, there is a need in the art for a handheld EAS or combined EAS/Scanner device configured to be ergonomically friendly and to hamper unauthorized access to such a device when parked on an associated docking station.

SUMMARY OF THE INVENTION

A system consistent with the invention includes a variety of aspects. According to one aspect of the invention there is provided a handheld EAS/Scanner device including: a barcode scanner configured for scanning a barcode; an antenna configured to transmit an electromagnetic field for modification of an activation state of at least one EAS tag disposed in the field; and a portable handheld housing configured to accept an energy storage element for driving the antenna. Advantageously, the scanner is configured for wireless connection to a point of sale network for accessing a database containing asset information associated with the barcode.

According to another aspect of the invention, there is provided a handheld EAS/Scanner including: an EAS system configured to modify an activation state of an EAS tag; a barcode scanner configured for scanning a barcode; and a housing configured for receiving the EAS system and the barcode scanner. The housing includes a handle having portions defining a handle cavity configured to accept an energy storage element.

According to another aspect of the invention, there is provided a handheld EAS/Scanner including: a barcode scanner configured for scanning a barcode; an antenna configured to transmit an electromagnetic field for modification of an activation state of at least one EAS tag disposed in the field; and a housing configured for receiving the barcode scanner and the antenna. The housing includes a face portion having portions defining a cavity configured for receiving the antenna.

According to another aspect of the invention, there is provided an EAS system including: a handheld EAS device; and a docking station configured to accept the EAS device. At least one of the EAS device and the docking station includes a locking feature having an activation state and a deactivation state.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

For simplicity and ease of explanation, the present invention will be described herein in connection with various exemplary embodiments thereof associated with EAS systems. Those skilled in the art will recognize that the features and advantages of the present invention may be implemented in a variety of configurations. It is to be understood, therefore, that the embodiments described herein are presented by way of illustration, not of limitation.

Figures 1A, 1B, 1C:
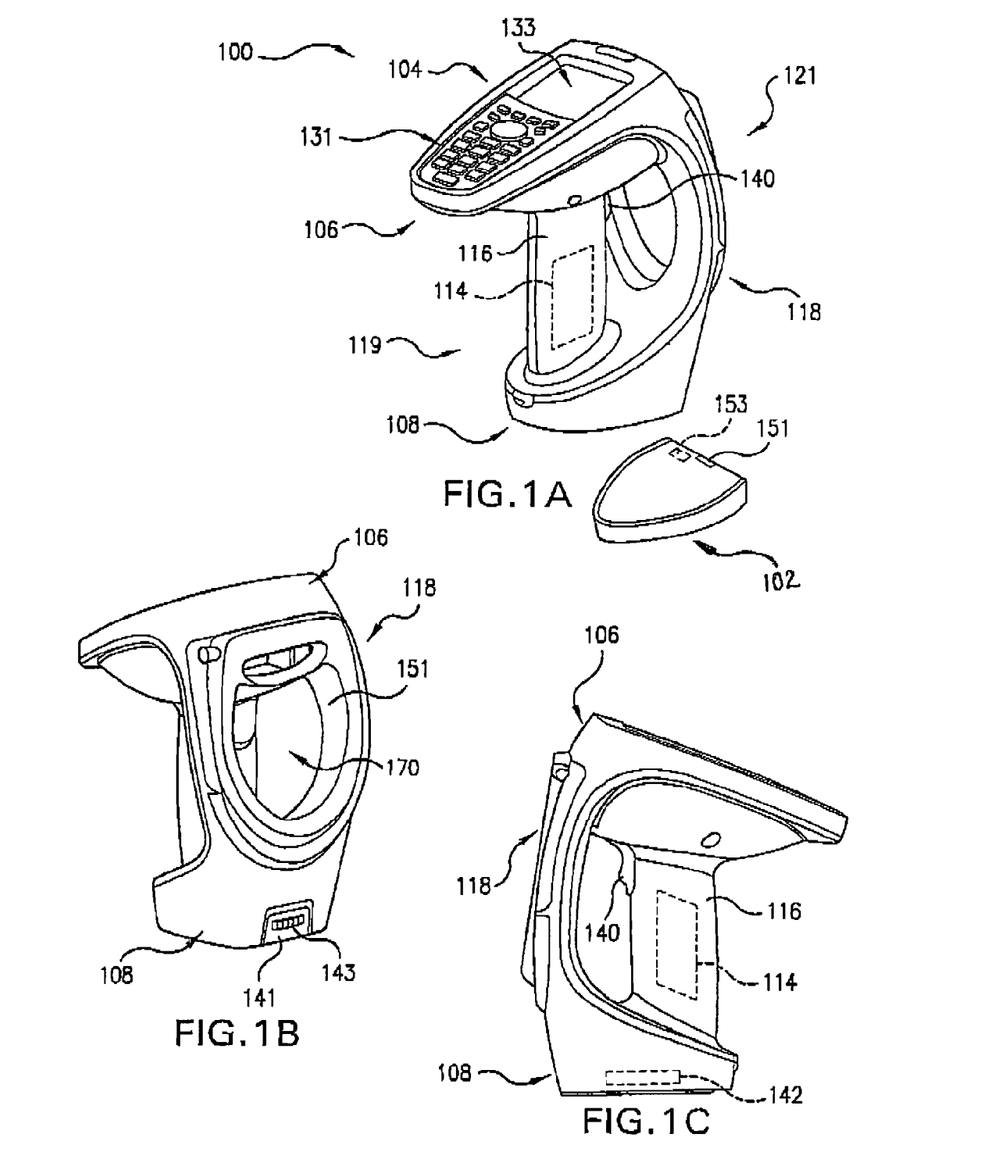
FIG. 1A is a top perspective view of an exemplary portable combined EAS and barcode device consistent with the invention and an associated docking station.
FIG. 1B is a rear perspective view of the exemplary device of FIG. 1A.
FIG. 1C is a side perspective view of the exemplary device of FIG. 1A.

Turning to FIG. 1A, a top perspective view of an exemplary portable handheld combined EAS device and barcode scanner 100 (hereinafter the "EAS/Scanner") and associated docking station 102 is illustrated. In general, the EAS/Scanner 100 may be configured to scan barcodes and to detect and modify the activation state of an EAS tag/marker, i.e., to deactivate, activate and/or reactivate EAS tags/markers. The EAS/Scanner 100 may include an outer housing to support and protect a variety of components. The outer housing may include a top portion 106 and a base portion 108. A handle 116 for a user to grasp when utilizing the EAS/Scanner 100 may be coupled between the top portion 106 and the base portion 108 at a proximal end 119 of the EAS/Scanner 100. A face portion 118 may also be coupled between the top 116 and the base 108 at a distal end 121 of the EAS/Scanner 100.

The top portion 106 may include a cavity to accept a user interface panel 104. The user interface panel may provide output data to a user and to enable a user to provide instructions to the EAS/Scanner 100. The user interface panel may include a key pad 131 and/or an LCD display 133. A touch pad LCD display may also be utilized to obviate the need for some or all of the keys on the key pad 131. A user may then provide instructions via the user interface panel 104 for operation of the EAS/Scanner 100 in various modes as later detailed herein. The top portion 106 may also include a barcode scanner disposed therein. A trigger 140 may also be provided on the handle 116. A user may depress the trigger 140 to activate any number of functions as later detailed herein depending, for example, on the particular operation mode.

Advantageously, an energy storage element 114, e.g., a capacitor, may be configured to fit within the handle 116 of the EAS/Scanner 100. Such an energy storage element 114 may be one of the heaviest components of the EAS/Scanner 100. As such, location of the energy storage element 114 in the handle 116 lowers the center of gravity of the EAS/Scanner 100 and enables it to be more ergonomically friendly to a user. Therefore, user fatigue is reduced.

When the EAS/Scanner 100 is not in use by authorized personnel, it may be coupled to an associated docking station 102. The docking station 102 may, among other things, provide access to a power source for recharging of the battery 142. In addition, because the EAS/Scanner 100 consistent with the invention may be utilized to detect and modify the activation state of EAS tags, the EAS/Scanner 100 and/or docking station 102 are advantageously equipped with a locking feature 153. The locking feature 153 generally has an activation state and a deactivation state. The activation state may physically lock or secure the EAS/Scanner 100 to the docking station, and the deactivation state may physically release the EAS/Scanner 100 from the docking station 102. In addition, the activation state may disable the EAS/Scanner 100 while the deactivation state may enable the EAS/Scanner.

The locking feature 153 may be any variety of locking features known in the art. The locking feature may, for example, be mechanical, electromechanical, electromagnetic, or electrical. The locking feature 153 is illustrated in phantom in the docking station 102 of FIG. 1A. However, the locking feature 153 may be located on either the EAS/Scanner 100, the docking station 102, or both. A mechanical locking feature may include a pin and cavity on both the docking station 102 and EAS/Scanner 100 that cooperate with one another to lock, either automatically or upon command by the user, when the EAS/Scanner 100 is docked on the docking station 102. Another mechanical locking feature may be a groove and projection that cooperates with the projection upon docking of the EAS/Scanner 100. Yet another mechanical locking feature may be a key system where authorized personnel are given a particular key to unlock to the EAS/Scanner 100 from the docking station 102.

In contrast to a mechanical locking feature, an electrical locking feature may allow the physical removal of the EAS/Scanner 100 from the docking station 102, but would not enable the EAS/Scanner 100 for use unless a proper release command was received prior to removal. Those skilled in the art will recognize many other locking features that may be utilized consistent with the invention to prevent the physical removal of the EAS/Scanner 100 from the docking station 102 or to disable the EAS/Scanner if unauthorized removal from the docking station occurred.

To release the locking feature 153, a variety of release mechanisms or signals may be utilized depending on the type of locking feature utilized. For instance, a release mechanism may be a key if the locking feature 153 is a mechanical key system. A release signal may also include a security code entered in by an authorized user via the user interface 104. As such, an individual without knowledge of the security code would be unable to remove the EAS/Scanner 100 from the docking station 102 or to enable the EAS/Scanner 100 for use. Those skilled in the art will recognize a variety of release commands and ways to provide a release signal that may be utilized in with a locking feature consistent with the present invention.

Turning to FIG. 1B, a rear perspective view of the distal end of the EAS/Scanner 100 is illustrated. The face portion 118 has a surface 151 defining an opening 170. The opening 170 may be of any suitable size and shape such that an associated antenna may fit within the face portion 118 of the housing about the opening 170. In the illustrated embodiment, the opening 170 has an elliptical shape such that an antenna of similar geometry and slightly greater size may fit within the face portion 118 of the housing about the opening 170. The base portion 108 of the outer housing may have a notch 141 and associated electrical terminals 143 to accept associated terminals 151 of the docking station 102.

Turning to FIG. 1C, a side perspective view of the EAS/Scanner 100 is illustrated. The energy storage element 114 is shown in phantom within the handle 116 to create an ergonomically friendly EAS/Scanner 100. In addition, a rechargeable battery 142 may be located within the base portion 108.

Figure 2:
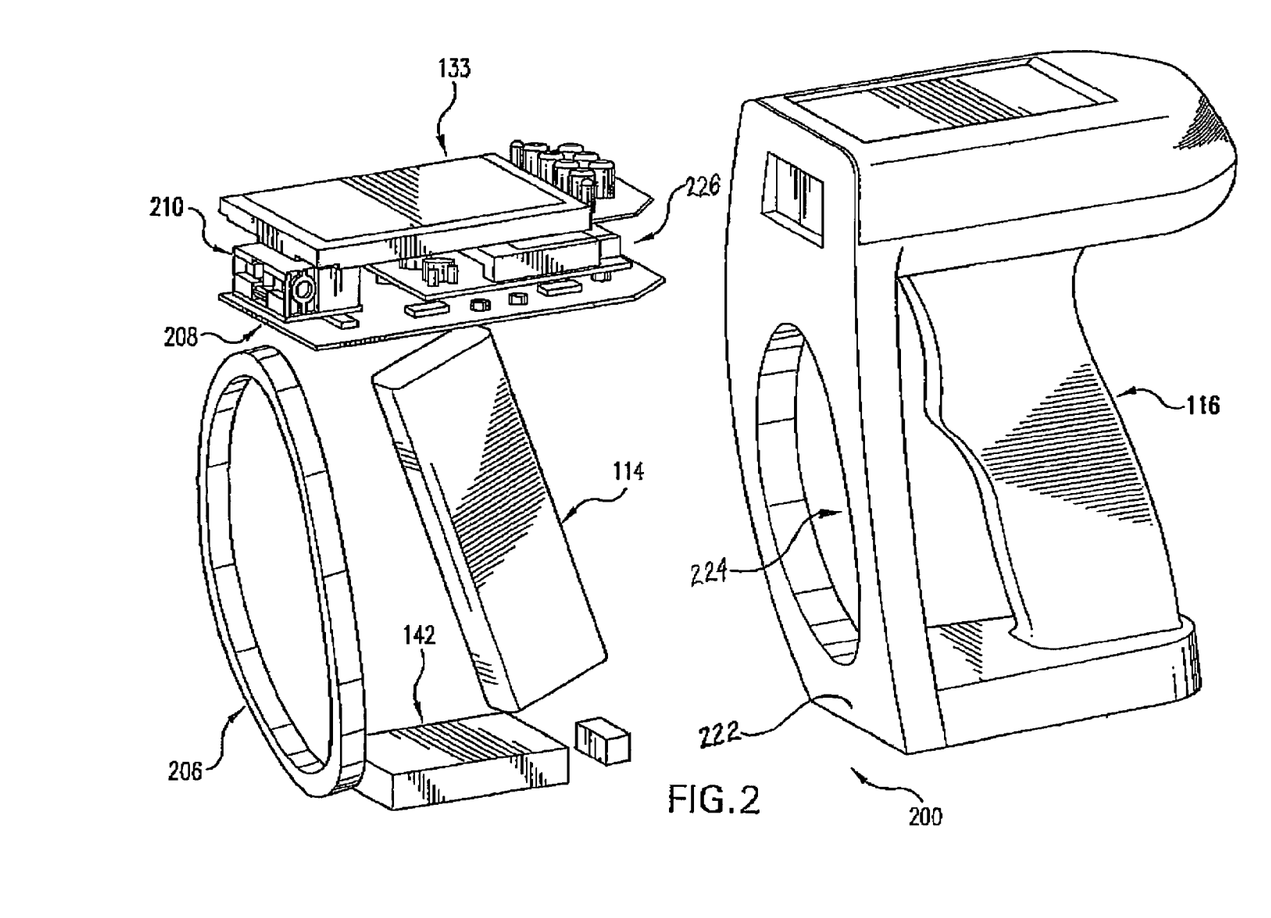
FIG. 2 is an exploded view of an exemplary portable combined EAS and barcode device consistent with the invention.

Turning to FIG. 2, an exploded perspective view of an exemplary EAS/Scanner 200 consistent with the invention is illustrated. As earlier detailed, the energy storage element 114, e.g., a capacitor in one embodiment, is sized and shaped to fit within the handle portion 116. To facilitate the portable nature of the EAS/Scanner 200, the battery 142 may be configured to fit, at least partially, within the base portion. The barcode scanner 210 may be any variety of scanners known in the art. The combined EAS/Scanner may also include an infrared data port 208, e.g. an IrDA port, for communicating with other systems. The barcode scanner 210, the user interface 104, infra red port, and associated electronics 226 may all be configured to fit within the top portion of the outer housing of the EAS/Scanner.

The face portion 118 of the housing includes a face plate 222 having an opening 224. The face plate 222 may be of varying shapes and sizes to accept an associated antenna therewith. The face portion 118 of the housing then surrounds the face plate 222 and the antenna. The antenna may be an inductive coil 206. The inductive coil 206 may have a circular shape to fit around the associated opening 224 of the face plate 222. As such, the diameter of the circular inductive coil 206 may be slightly larger than the diameter of the opening 224 in the face plate 222. The coil 206 may be a substantially circular air-core coil where the coil size and ampere turns are selected to achieve the required field level for detection and modification of EAS tags, e.g. magnetomechanical tags, at a predetermined distance from the coil 206, e.g., typically 1 to 6 inches.

Figure 3:
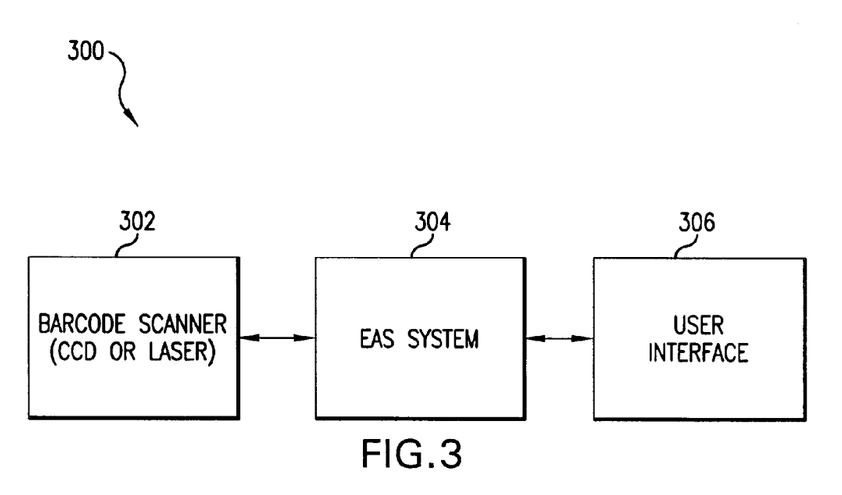
FIG. 3 is a block diagram an exemplary portable combined EAS device and barcode scanner consistent with the invention.

Turning to FIG. 3, a simplified block diagram 300 of an exemplary EAS/Scanner consistent with the invention is illustrated. In general, the EAS/Scanner includes a barcode scanner 302, an EAS system 304, and a user interface 306. The barcode scanner 302 may be any variety of known and commercially available barcode scan engines such as pen-type, CCD, laser, or camera based systems. The barcode scanner 302 may be interfaced with the EAS system 304 via control input/output (I/O) connections and a serial communications line.

The EAS system 304 may be configured to detect and modify any type of EAS tag. Those skilled in the art will recognize that multiple types of EAS tags exist. The three most common tags are EM (electromagnetic), RF (radio-frequency), and AM (acousto-magnetic). The three different types work within their respective detection, activation, and deactivation systems. A variety of transmitter and receiver system for exciting and detecting the presence of such tags are well known and commercially available. Accordingly, the basic methods of exciting and detecting all such markers are not detailed herein. However, embodiments of the present invention are particular useful with magnetomechanical tags. Details of detection and modification of such magnetomechanical tags are provided below.

The user interface 306 provides a mechanism for facilitating user input into the system. The user interface 306 may be configured to allow a user to change operating modes, enter security codes to enable the device, and to provide information regarding the article being processed. The user interface 306 may include a backlight button and a power on/off button.

Figure 4:
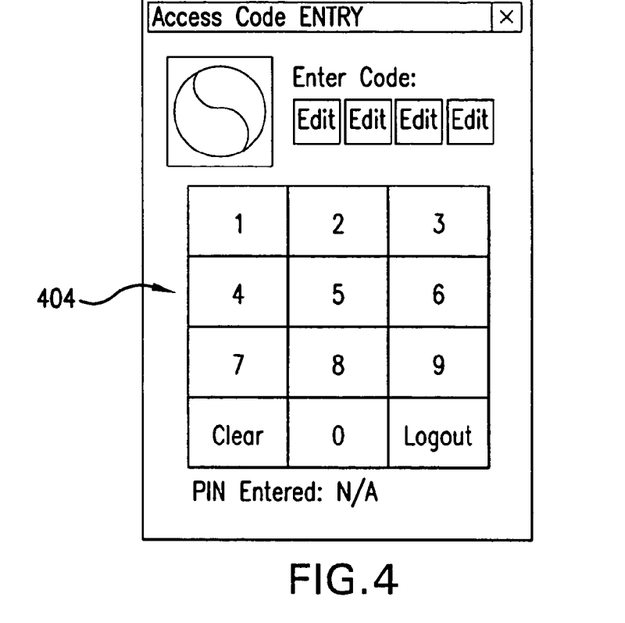
FIG. 4 illustrates an exemplary user interface screen for a combined EAS device and barcode scanner consistent with the invention.
Figure 5:
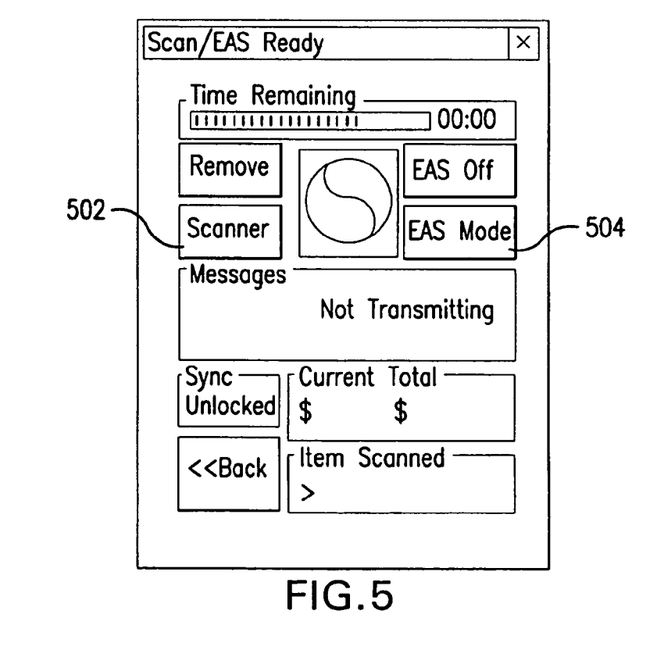
FIG. 5 illustrates another exemplary user interface screen for a combined EAS device and barcode scanner consistent with the invention.

In one embodiment, the user interface may include a touch panel LCD display 104 and a trigger input switch 140. FIG. 4, for example, illustrates a user interface configured for receiving a security code entry. In the illustrated embodiment, a security code may be entered using touch panel numerical keys 404 on the user interface to permit access to selected functionality associated with the security code. Once an appropriate security code is entered, the user interface may allow various barcode scanning and EAS functions to be performed by access to associated user interface screens. FIG. 5, for example, illustrates an exemplary user interface screen for SCAN/EAS mode wherein a user may select the "Scanner" key 502 to scan a barcode and select "EAS Mode" 504 to select any one of a variety of EAS operation modes as later detailed herein.

Figure 6:
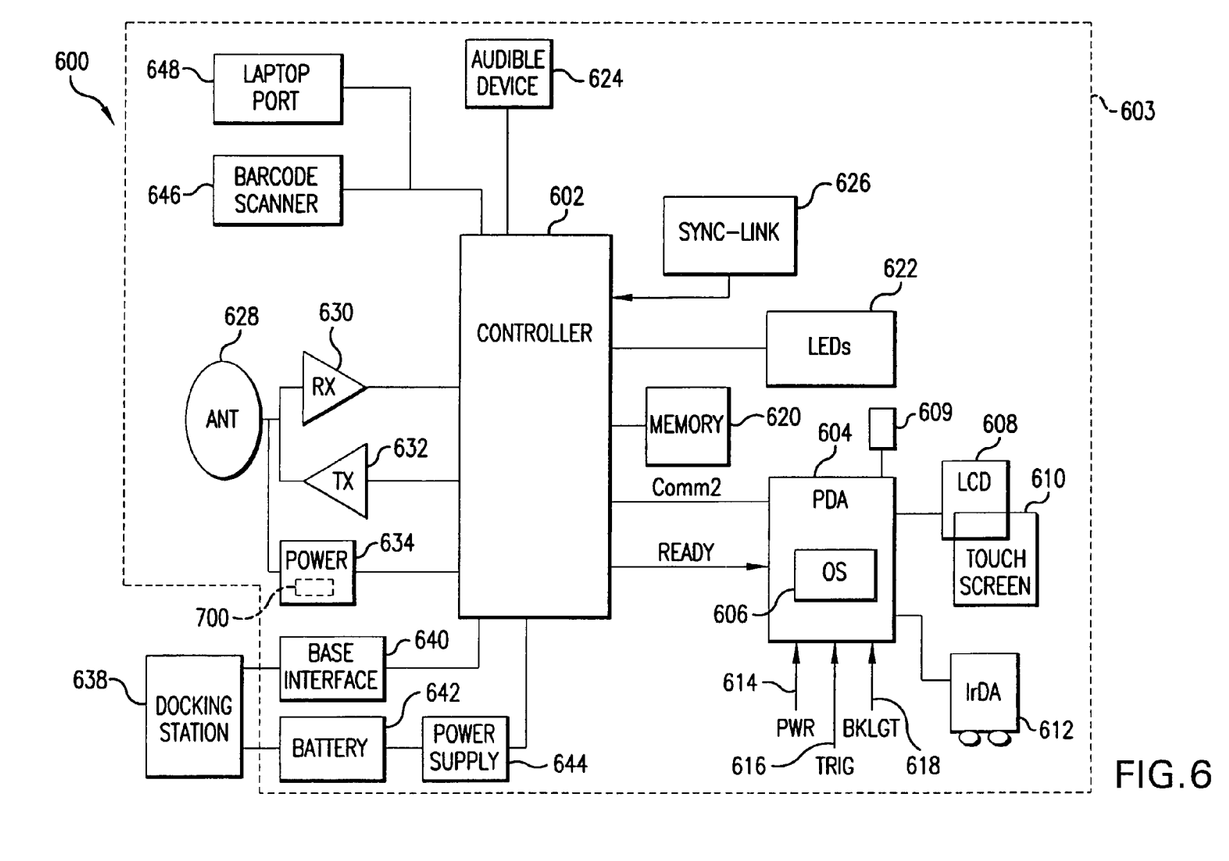
FIG. 6 is a detailed block diagram of one exemplary portable combined EAS device and barcode scanner consistent with the invention.

Turning to FIG. 6, a more detailed block diagram of an exemplary EAS/Scanner system 600 consistent with the invention is illustrated. The EAS/Scanner system 600 includes an EAS/Scanner 603 coupled to a docking station 638. The EAS/Scanner 603 includes a controller 602 to control all EAS functions. The controller 602 may include a digital signal processor (DSP) and microcontroller as further detailed herein. A user may interface with the controller 602 via a portable digital assistant (PDA) 604. The PDA 604 may have its own operating system 606. An LCD interface 608 may also be provided to display data to a user of the EAS/Scanner 603 and to provide a touch screen mechanism 610 to enable a user to input various data to the EAS/Scanner, e.g., to change operation modes, enter security codes, etc.

Advantageously, an EAS/Scanner consistent with the invention may be configured for wireless bidirectional communication with devices on an associated point of sale (POS) network, e.g. the EAS/Scanner may be configured as a node on the network. Those skilled in the art will recognize that the EAS/Scanner may be wirelessly connected to the network in a variety of ways, e.g. through communication of electromagnetic signals between antennas, by an infra red link such as an IrDA0 link, etc. In the illustrated exemplary embodiment, an infrared data association (IrDA) control unit 612 is provided for establishing wireless infrared bidirectional communication between the EAS/Scanner 603 and any other variety of devices, e.g., devices in an associated point of sale (POS) network.

A power switch may be provided on the EAS/Scanner 603 to enable a user to provide a power ON and power OFF command to the EAS/Scanner via the power interface path 614 to the PDA 604. A trigger switch may be provided on the EAS/Scanner 603 to enable a user to provide a trigger function to the EAS/Scanner via a trigger path 616 to the PDA 604. Such trigger path provides a trigger signal, e.g., based on user instructions, as to a desired operation mode. A variety of operation modes as are later detailed herein then may be selected. In addition, a backlight switch may be adjusted to adjust backlighting via backlight path 618 to the PDA 604. As such, the brightness of the LCD display 608 may be adjusted to account for various user preferences and lighting conditions.

Memory 620 may be coupled to the controller 602 to provide data storage capabilities. The type and size of such memory 620 may be selected based on particular requirements, e.g., 128 kB of SRAM may be utilized in one instance. A variety of LEDs 622 of varying colors, e.g., green, yellow, and red, may be utilized to provide various visual indicators to a user of the EAS/Scanner 603. An audible device 624 may also be provided to provide a user with an audible output in certain conditions.

A synchronization link 626, e.g., a UHF wireless EAS synchronization, may also be provided to synchronize the EAS system 600 of the EAS/Scanner 603 with other EAS devices or systems in the area to eliminate interference between the EAS/Scanner 603 and other EAS devices. Such a synchronization link 626 may utilize a UHF receiver that detects a pulse train at 50/60 Hz used by other EAS systems as a transmit/receive reference. If this signal is lost, the system may revert to an asynchronous rate chosen to interfere the least with other EAS systems, e.g., 30 Hz in one instance.

An antenna 628 may be configured to act as a transducer to transmit an EAS signal which is used to excite an EAS tag and then used receive a return signal from an EAS tag. In addition, the antenna 628 may be utilized to transmit a deactivation signal to deactivate an EAS tag or a reactivation signal to reactivate an EAS tag as further detailed herein. The receiver 630 may be configured to perform analog signal processing, including amplification and filtering, on the received EAS tag signal. The transmitter 632 may be configured to perform analog signal processing, including amplification, on the transmitted signal to excite an EAS tag. In general, the power module 634 provides analog signal processing, including amplification, on a transmitted signal to deactivate or reactivate an EAS tag.

A docking station 638 may also be provided for "docking" the EAS/Scanner 603. The docking station 638 may provide a variety of functions including a communication interface for the EAS/Scanner 603 to communicate with other devices and systems, e.g., to upload and download data, and for recharging the battery 642. The battery 642 may be part of the EAS/Scanner 603 and, in one embodiment, may be located in the base portion 108 of the housing of the EAS/Scanner 603. The battery 642 may be any variety of rechargeable battery. The base interface circuit 640 provides an interface between the EAS/Scanner 603 and docking station 638 when the EAS/Scanner 603 is coupled to the docking station 638. The base interface circuit 610 may provide communication, charge signals, and power supply protection to the EAS/Scanner 603 when coupled to the docking station 638. The battery power supply 644 converts battery voltage to other voltage levels need for the EAS/Scanner 603.

A barcode scanner 646 which may be any variety of scanners known in the art, e.g., pen-type, CCD, laser, or camera based systems, is also provided in the EAS/Scanner 603. The barcode scanner 646 may be used for a variety of purposes such as inventory control and for managing point of sale (POS) transactions. In a typical POS transaction, upon purchase of an article, the barcode is scanned at a POS station. The barcode represents a reference number that is communicated from the EAS/Scanner 603, e.g. wirelessly, to a computer which accesses an associated record containing asset information such as product name, vendor name, price, quantity-on-hand, etc. The computer may transmit the asset information, e.g. wirelessly, for display on the user interface 610. Finally, the EAS/Scanner 603 may also have a laptop port 648 to permit communication between the EAS/Scanner and a laptop computer.

In operation, the EAS/Scanner 603 is responsive to user input instructions to operate in a variety of scan and scan/EAS modes as later detailed herein. For instance, the EAS/Scanner 603 may accept user input instructions from the trigger switch 140 to start operation of the EAS/Scanner 603 in a particular operation mode. Alternatively, the EAS/Scanner 603 may be responsive to user input instructions from a user interface such as the touch screen 610 on the LCD display 608 or from a keypad 609. In addition, certain activities in various modes may automatically trigger EAS actions. For instance, in an automatic EAS deactivation mode, the EAS/Scanner 603 will automatically initiate a deactivation of an EAS tag when a barcode is successfully detected and read.

EAS tag detection and modification of an active state of an EAS tag may be accomplished in a variety of ways depending on, among other things, the type of EAS tag utilized. Modification of an active state of an EAS tag may include deactivating, activating, and reactivating. Description of detecting and modification of an active state of an EAS tag is made herein with respect to magnetomechanical EAS tags.

As is known in the art, when a magnetomechanical EAS tag receives the correct transmitted interrogation frequency, the tag resonates and can be detected. User input through the user interface coupled to the PDA 604 is communicated to the controller 602 to initiate various mode selections such as EAS tag detection. A burst of the desired interrogation frequency, e.g., 58 kHz, is transmitted by the transmitter 632 and antenna 628 at a predetermined repetition rate. The controller 602 ensures proper timing control for the transmitted signal. If an EAS tag is in the interrogation zone, it will emit a small electromagnetic wave at the resonant frequency, e.g., 57 kHz to 59 kHz. The receiver 630 tuned to the same frequency receives a return signal from the transmitted interrogation signal. The returned signal is sent to the controller 602 for processing. The controller may include an analog to digital converter to provide a digital signal representative of the returned signal to a digital signal processor (DSP) which is part of the controller 602. The controller utilizing the DSP determines if the returned signal is representative of an EAS tag by examining selected attributes of the returned signal. For instance, the returned signal should have proper spectral content and should be received in successive spectral windows. If the controller 602 determines that the returned signal is a valid EAS tag signal, the controller 602 may then take other steps depending on the operation mode of the EAS/Scanner 603. For example, notification of EAS tag detection may be audio notification via the audible device 624 or visual notification via the LEDs 622 or the LCD 608.

Figure 7:
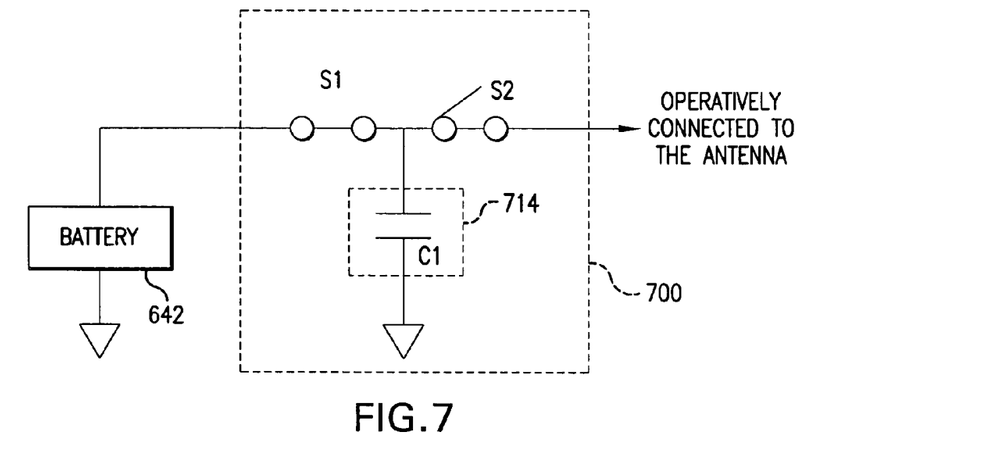
FIG. 7 is an exemplary modification circuit to modify an activation state of an EAS tag.

For deactivation, the controller 602 may signal the power module 634 to generate an EAS tag deactivation pulse. The power module 634 may include an exemplary state modifying circuit 700 as illustrated in FIG. 7 which provides an appropriate drive signal to the antenna 628. During a charging cycle to charge the energy storage element 714, switch S1 is closed and switch S2 is open to couple the battery 642 to the energy storage element 714. As earlier detailed, the energy storage element 714 may be a capacitor C1 and the capacitor may advantageously fit within the handle of the EAS/Scanner. After the energy storage element 714 is charged to an appropriate voltage level, switch S1 is opened.

Upon receipt of a deactivation control signal from the controller 602, switch S2 of the deactivation circuit closes while S1 remains open. This initiates a natural resonant discharge producing a decaying alternating sinusoidal current waveform from a coil antenna. The inductance value of the inductive coil, the capacitance value of a capacitor utilized as the energy storage element 714, and the initial voltage charge on the energy storage element determines the strength of the decaying sinusoidal waveform. These parameters may be sized to produce a magnetic field level of sufficient strength to deactivate an EAS tag in a proximity range, e.g., 1 to 6 inches, of the coil. In one example, a capacitor utilized as the energy storage element 714 may be 175 μF charged to 160 volts.

An EAS tag may be activated or reactivated by exciting the EAS tag with an electromagnetic pulse of sufficient magnitude. As with deactivation of an EAS tag, this may also be done by discharging the energy storage element 714 into the coil antenna. A decaying sinusoidal signal of only one cycle is enough to activate or reactivate an EAS tag in a proximity range, e.g., 1 to 6 inches, of the coil. In one example, a capacitor utilized as the energy storage element 714 may also be 175 μF charged to 160 volts.

An EAS/Scanner consistent with the invention may have a variety of operation modes that a user may select via a user interface such as the touch screen 610 or a keypad 609. The controller 602 is responsive to such user commands to control operation of the EAS/Scanner in one of the variety of operation modes. In general, the scanner and EAS system may operate independently of each other or in combination. A proper scan may be followed by various EAS operations or any variety of EAS operations may be followed by a scan. An exemplary, but not exclusive list, of such operation modes is detailed herein.

A scan only mode may be selected in which the barcode scanner 646 operates to scan a barcode and process such data. The EAS system is disabled in such a scan only mode. Alternatively, a barcode scan may be followed by a variety of EAS operation modes including automatic deactivation mode, manual deactivation mode, detection mode, and reactivation mode. In a scan/automatic deactivation mode a barcode is scanned and an EAS tag is searched for and automatically deactivated when found. In a scan/detection mode a barcode is scanned and an EAS tag is searched for and detected. Detection notice, which may be audio notice (eg., via the audible device 634), visual notice (e.g., via the LEDs 622 or LCD 608), or both may then be provided to a user. In a scan/manual deactivation mode a barcode is scanned and a user the searches for an EAS tag. Detection notice may be provided to the user once the EAS tag is detected and then the user may take action to deactivate the EAS tag. For example, the user may pull the trigger 140. In a scan/reactivation mode a barcode is scanned and a user takes action to reactivate an EAS tag.

The automatic deactivation mode, manual deactivation mode, detection mode, and reactivation mode for the EAS system as earlier described in conjunction with the prior scan operation may also be performed independently of any scanning operation in an EAS only mode. In such EAS only mode, the scanner is effectively disabled.

In addition, the scanner may be enabled only after a successful EAS operation such as automatic deactivation, manual deactivation, or reactivation. For instance, an automatic deactivation/scan mode first detects an EAS tag. Once detected, the EAS tag is automatically deactivated. The scanner is then enabled to enable a barcode to be scanned. A manual deactivation/scan mode first detects an EAS tag and provides notice to a user. An action may then be taken to deactivate the tag. The scanner is then enabled to enable a barcode to be scanned. A reactivation/scan mode first detects and activates an EAS tag. The scanner is then enabled to enable a barcode to be scanned.

Figure 8A:
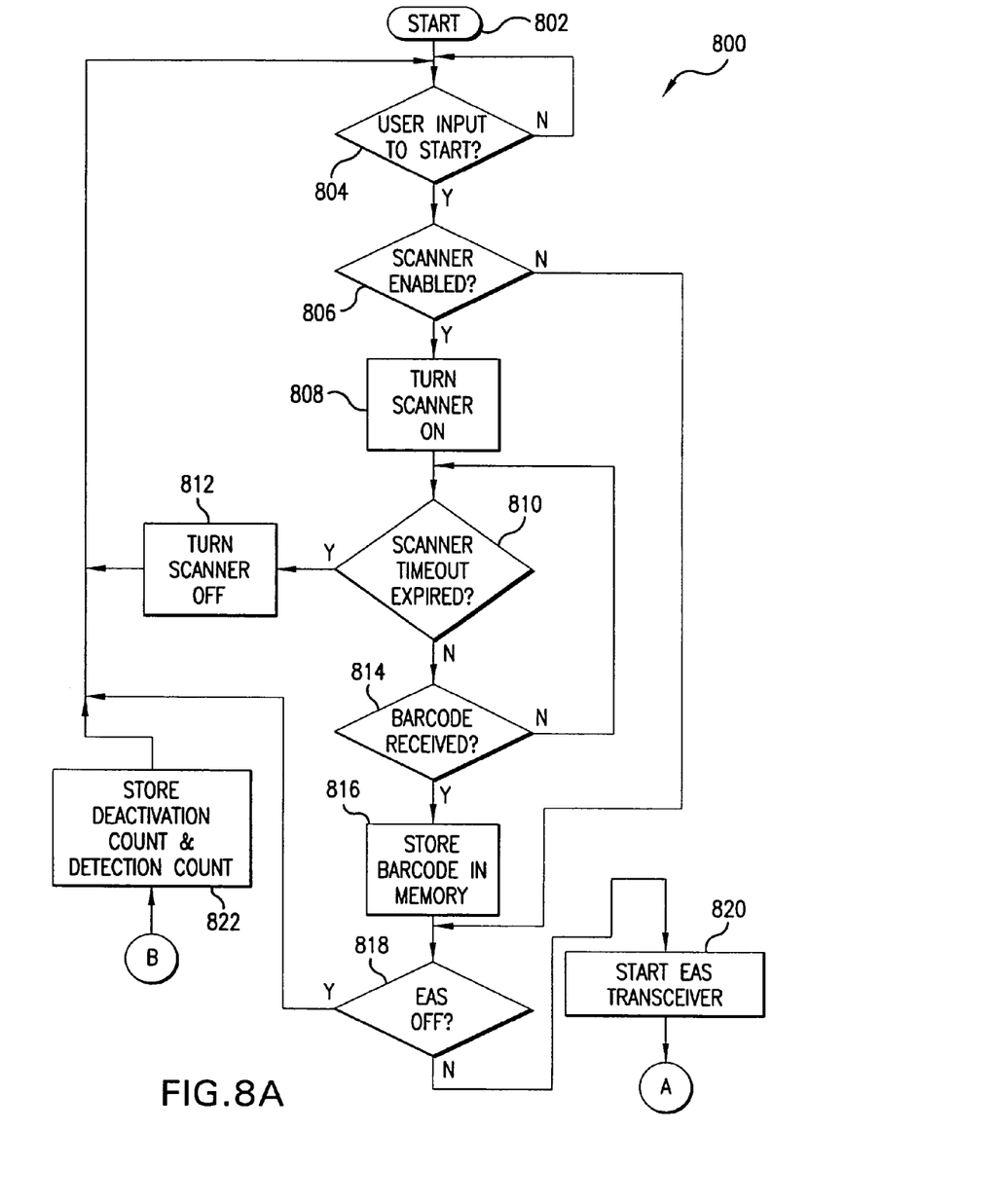
FIG. 8A is a flow chart illustrating various barcode scanner and EAS operation modes for a combined EAS device and barcode scanner consistent with the invention.
Figure 8B:
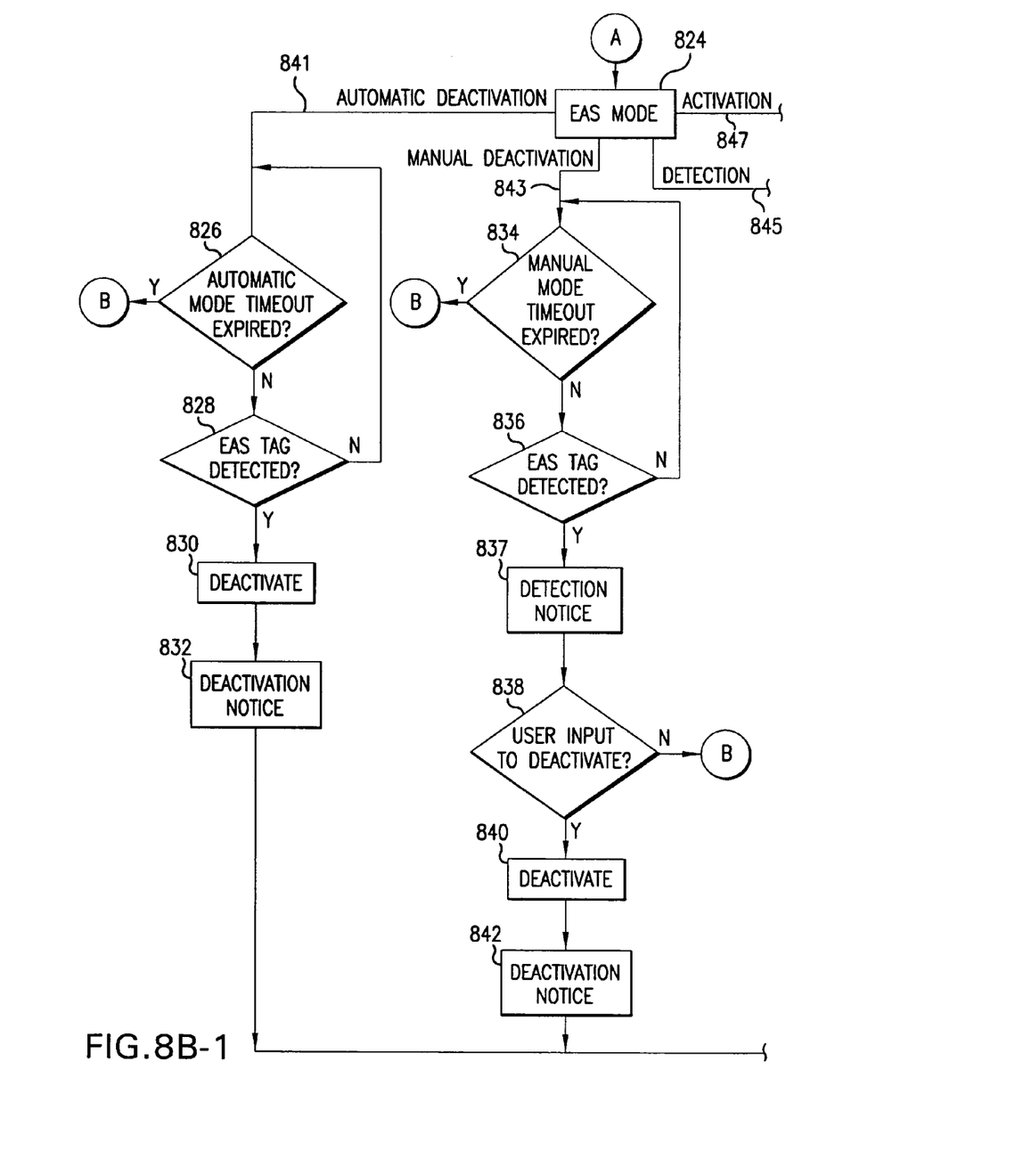
FIG. 8B is a continuation of the flow chart of FIG. 8A.
Figure 8B:
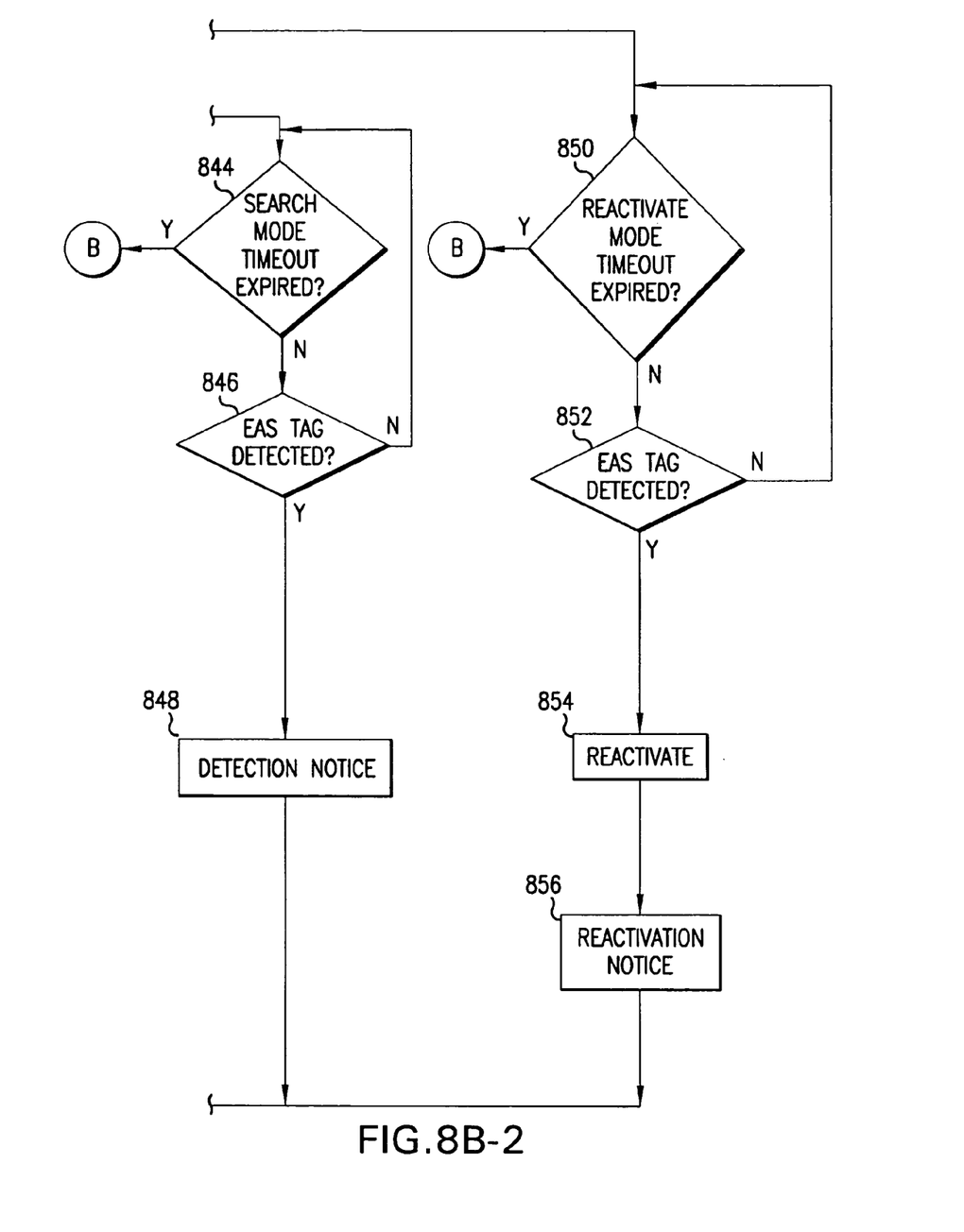

FIGS. 8A and 8B are an exemplary flowchart of various operations modes for an exemplary EAS/Scanner consistent with the invention. As shown, when the EAS/Scanner is powered ON 802 it may enter a lower power or sleep state as it awaits user input to start 804. Once the controller 602 receives notice to start, it determines if the scanner is enabled 806. If the scanner is enabled, the scanner is turned on 808 and the scanner searches for a barcode. If the scanner timeout period expires 810, e.g., approximately 5 seconds in one instance, then the controller 602 turns the scanner off 812 and returns the EAS/Scanner to the low power wait mode.

If a barcode is received 814, the barcode may then be stored in memory 620 in step 816 and various barcode processing may then take place based on such data. If a barcode is not received the scanner may keep looking for a barcode until the scanner timeout period expires 810. Based on user instructions, the controller 602 determines if the EAS system should, be enabled or not 818. If not, the controller places the EAS/Scanner is a low power wait mode. If the EAS system is enabled, the controller 602 starts the EAS transceiver 820 (e.g., the transmitter 632, receiver 630, and associated power supply module 634) and any one of four major EAS modes 824 may then be entered based on the selected operation mode.

Turning to FIG. 8B, the first EAS mode is the automatic deactivation mode as indicated by path 841 from the EAS mode selection block 824. If a predetermined automatic expiration time interval, e.g., approximately 5 seconds in one instance, has expired 826 then the controller 602 instructs storage of any detection or deactivation count data 822, e.g., in memory 620, and the system returns to a low power wait mode. If such time interval has not expired, then the system may search for an EAS tag 828. If an EAS tag is detected, then the EAS tag is automatically deactivated 830. If an EAS tag is not detected, an operator may continue to search for an EAS tag until the automatic expiration time interval expires 826. If an EAS tag is deactivated 830, the controller 602 may cause a deactivation notice to be provided to the user. This deactivation notice 832 may be audio notice (eg., via the audible device 634), visual notice (e.g., via the LEDs 622 or LCD 608), or both.

A second EAS mode is a manual deactivation mode as indicated by path 843 from the EAS mode selection block 824. Again, if a predetermined automatic expiration time interval has expired 834, the controller instructs storage of any detection or deactivation count data 822 in memory and the system may return to the low power wait mode If such time interval has not expired, then to system may search for an EAS tag 836. If an EAS tag is detected, then a detection notice 837 may then be provided to a user. If an EAS tag is not detected, an operator may continue to search for an EAS tag until the automatic expiration time interval expires 834. Once detection notice is provided a user is prompted in operation 838 for a user input action, e.g., to depress trigger 140, in order to start deactivate the EAS tag. The EAS tag is then deactivated 840, and a deactivation notice 842 may be provided to the user.

A third EAS mode is a detection mode as indicated by path 845 from the EAS mode selection block 824. Again, if a predetermined automatic expiration time interval has expired 844, then the controller instructs storage of any detection or deactivation count data 822 in memory and the system may return to the low power wait mode. If such time interval has not expired, then the system may search for an EAS tag 846. If an EAS tag is detected, a detection notice 848 may be provided to a user. If an EAS tag is not detected, an operator may continue to search for an EAS tag until the automatic expiration time interval expires 844.

Finally, a fourth EAS mode is an activation or reactivation mode as indicated by path 847 from the EAS mode selection block 824. If the timeout period has not expired 850 and an EAS tag is detected 852, the system will activate or reactivate the EAS tag 854. Notice of such reactivation 856 may be provided to the user. The controller may instruct the system to search for the presence of an active tag in order to confirm activation before providing the reactivation notice 856. The system may save the number of detections and deactivations, e.g., to memory 620, and associate that number with the barcode scanned, if any.

It will be appreciated that the functionality described for the embodiments of the invention may be implemented using hardware, software, or a combination of hardware and software, and well-known signal processing techniques. If implemented in software, a processor and machine-readable medium is required. The processor can be any type of processor capable of providing the speed and functionality required by the embodiments of the invention. For example, the processor could be a process from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further, the processor and machine-readable medium may be part of a larger system that may contain various combinations of machine-readable storage devices through various I/O controllers, which are accessible by the processor and which are capable of storing a combination of computer program instructions and data.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A handheld Electronic Article Surveillance (EAS)/Scanner comprising:
   an EAS system comprising an antenna configured to transmit an electromagnetic field for modification of an activation state of at least one EAS tag disposed in said field;
   a barcode scanner configured for scanning a barcode;
   a housing configured for receiving said EAS system and said barcode scanner, said housing comprising a handle, said handle having portions defining a handle cavity; and
   at least one capacitor for driving said antenna, said at least one capacitor being disposed in said handle cavity and configured to be energized by a battery.

2. The EAS/Scanner device of claim 1, wherein said housing further comprises a base portion and wherein an end of said handle is coupled to said base portion, and wherein said battery is disposed in said base portion.

3. The EAS/Scanner of claim 1, wherein said EAS tag comprises a magnetomechanical tag.

4. The EAS/Scanner of claim 1, wherein said housing further comprises a top portion having a proximal end and a distal end, and wherein a first end of said handle is coupled to said proximal end of said top portion.

5. The EAS/Scanner of claim 4, wherein said housing further comprises a base portion having a proximal end and a distal end, and wherein a second end of said handle is coupled to said proximal end of said base portion.

6. The EAS/Scanner of claim 4, wherein said housing further comprises a face portion having one end coupled to said distal end of said top portion, said face portion having portions defining a cavity therein, and wherein said antenna is configured to be disposed at least partially within said cavity.

7. The EAS/Scanner of claim 6, wherein said antenna comprises an inductive coil.

8. The EAS/Scanner of claim 1, wherein said housing further comprises a base portion having a proximal end and a distal end and wherein said handle is coupled to said proximal end of said base portion, and wherein a fake portion is coupled to said distal end of said base portion, said face portion having portions defining a cavity therein, and wherein said antenna is configured to be disposed at least partially within said cavity.

9. The EAS/Scanner of claim 1, wherein said EAS/Scanner is configured for wireless connection to a point of sale network for accessing a database containing asset information associated with said barcode.

10. The EAS/Scanner of claim 1, wherein said EAS system is configured to operate in a plurality of operation modes.

11. The EAS/Scanner of claim 10, wherein one of said operation modes is a detection mode wherein said EAS system is configured to detect said EAS tag.

12. The EAS/Scanner of claim 10, wherein one of said operation modes is an automatic deactivation mode wherein said EAS system is configured to deactivate said EAS tag automatically upon detection of said EAS tag.

13. The EAS/Scanner of claim 10, wherein one of said operation modes is a manual deactivation mode wherein said EAS system is configured to deactivate said EAS tag upon instruction from a user.

14. The EAS/Scanner of claim 10, wherein one of said operation modes is an activation mode wherein said EAS system is configured to activate said EAS tag.

15. The EAS/Scanner of claim 10, wherein one of said operation modes is a reactivation mode wherein said EAS system is configured to reactivate said EAS tag.

16. The EAS/Scanner of claim 1, wherein said at least one capacitor comprises a 175 µF capacitor charged to 160 volts by said battery.

17. A handheld Electronic Article Surveillance (EAS)/Scanner device comprising:
   a barcode scanner configured for scanning a barcode;

an antenna configured to transmit an electromagnetic field for modification of an activation state of at least one EAS tag disposed in said field;

a portable handheld housing comprising a handle, said handle including portions defining a handle cavity;

at least one capacitor for driving said antenna, said at least one capacitor being disposed in said handle cavity and configured to be energized by a battery; and a controller configured to control said antenna for generation of said electromagnetic field in response to input from a user.

18. The EAS/Scanner device of claim 17, wherein said housing further comprises a base portion and wherein an end of said handle is coupled to said base portion, and wherein said battery is disposed in said base portion.

19. The EAS/Scanner of claim 17, wherein said EAS/Scanner is configured for wireless connection to a point of sale network for accessing a database containing asset information associated with said barcode.

20. The EAS/Scanner device of claim 17, wherein said EAS tag comprises a magnetomechanical tag.

21. The EAS/Scanner device of claim 17, wherein said antenna comprises an inductive coil.

22. The EAS/Scanner device of claim 17, wherein said housing further comprises a face portion, said face portion having portions defining a cavity therein, and wherein said antenna is configured to be disposed at least partially within said cavity.

23. The EAS/Scanner device of claim 22, wherein said antenna comprises an inductive coil and said EAS tag comprises a magnetomechanical tag.

24. The EAS/Scanner device of claim 17, wherein said at least one capacitor comprises a 175 μF capacitor charged to 160 volts by said battery.

25. A handheld Electronic Article Surveillance (EAS)/Scanner comprising:

a barcode scanner configured for scanning a barcode;

an antenna configured to transmit an electromagnetic field for modification of an activation state of at least one EAS tag disposed in said field;

a housing configured for receiving said barcode scanner and said antenna, said housing comprising a face portion, said face portion having portions defining a cavity therein configured for receiving said antenna, said housing further comprising a handle, said handle having portions defining a handle cavity; and at least one capacitor for driving said antenna, said at least one capacitor being disposed in said handle cavity and configured to be energized by a battery.

26. The EAS/Scanner of claim 25, wherein said EAS tag comprises a magnetomechanical tag.

27. The EAS/Scanner of claim 25, wherein said antenna comprises an inductive coil.

28. The EAS/Scanner of claim 25, wherein said EAS/Scanner is configured for wireless connection to a point of sale network for accessing a database containing asset information associated with said barcode.

29. The EAS/Scanner of claim 25, wherein said at least one capacitor comprises a 175 μF capacitor charged to 160 volts by said battery.

30. An Electronic Article Surveillance (EAS) system comprising:

a handheld EAS/Scanner device comprising a barcode scanner configured for scanning a barcode, an antenna configured to transmit an electromagnetic field for modification of an activation state of at least one EAS tag disposed in said field, a portable handheld housing comprising a handle, said handle including portions defining a handle cavity, and at least one capacitor for driving said antenna, said at least one capacitor being disposed in said handle cavity and configured to be energized by a battery;

a docking station configured to accept said EAS/Scanner device; and at least one of said EAS/Scanner device and said docking station comprising a locking feature having an activation state and a deactivation state.

31. The EAS system of claim 30, wherein said locking feature in said activation state is configured to physically secure said EAS/Scanner device to said docking station.

32. The EAS system of claim 31, wherein said locking feature in said deactivation state is configured to physically release said EAS/Scanner device from said docking station.

33. The EAS system of claim 30, wherein said locking feature in said activation state is configured to disable said EAS/Scanner device.

34. The EAS system of claim 33, wherein said locking feature in said deactivation state is configured to enable said EAS/Scanner device.

35. The EAS system of claim 30, wherein said locking feature automatically enters said activation state upon coupling of said EAS/Scanner to said docking station.

36. The EAS system of claim 30, wherein said locking feature is responsive to a release command to enter said deactivation state.

37. The EAS system of claim 30, wherein said at least one capacitor comprises a 175 μF capacitor charged to 160 volts by said battery.

* * * * *